US006898899B2

(12) United States Patent
Weder (10) Patent No.: US 6,898,899 B2
(45) Date of Patent: May 31, 2005

(54) FLORAL CONTAINER WITH ACCORDION FOLDED UPPER PORTION

(75) Inventor: Donald E. Weder, Highland, IL (US)

(73) Assignees: Wanda M. Weder, Highland, IL (US); William F. Straeter, Highland, IL (US); not individually but solely as Trustees of The Family Trust U/T/A dated Dec. 8, 1995

( * ) Notice: Subject to any disclaimer, the term of this patent is extended or adjusted under 35 U.S.C. 154(b) by 0 days.

(21) Appl. No.: 10/720,248

(22) Filed: Nov. 24, 2003

(65) Prior Publication Data
US 2004/0144028 A1 Jul. 29, 2004

Related U.S. Application Data

(63) Continuation-in-part of application No. 09/732,625, filed on Dec. 8, 2000, now abandoned.

(51) Int. Cl.⁷ .................................................. A01G 9/02
(52) U.S. Cl. .......................................................... 47/72
(58) Field of Search ............................................... 47/72

(56) References Cited

U.S. PATENT DOCUMENTS

| | | |
|---|---|---|
| 524,219 A | 8/1894 | Schmidt |
| 732,889 A | 7/1903 | Paver |
| 950,785 A | 3/1910 | Pene |
| 1,044,260 A | 11/1912 | Schloss |
| 1,063,154 A | 5/1913 | Bergen |
| 1,446,563 A | 2/1923 | Hughes |
| 1,520,647 A | 12/1924 | Hennigan |
| 1,525,015 A | 2/1925 | Weeks |
| 1,610,652 A | 12/1926 | Bouchard |
| 1,697,751 A | 1/1929 | Blake ......................... 229/87 |
| 1,794,212 A | 1/1931 | Snyder |
| 1,863,216 A | 6/1932 | Wordingham |
| 1,978,631 A | 10/1934 | Herrlinger ..................... 91/68 |
| 2,048,123 A | 7/1936 | Howard ........................ 229/87 |
| RE21,065 E | 5/1939 | Copeman ......................... 93/2 |
| 2,170,147 A | 8/1939 | Lane .......................... 206/56 |
| 2,200,111 A | 5/1940 | Bensel ....................... 229/1.5 |
| 2,278,673 A | 4/1942 | Savada et al. ................ 154/43 |
| 2,302,259 A | 11/1942 | Rothfuss ....................... 41/10 |
| 2,323,287 A | 7/1943 | Amberg ........................ 229/53 |
| 2,355,559 A | 8/1944 | Renner ......................... 229/8 |
| 2,371,985 A | 3/1945 | Freiberg ...................... 206/46 |
| 2,411,328 A | 11/1946 | MacNab ........................ 33/12 |

(Continued)

FOREIGN PATENT DOCUMENTS

| | | |
|---|---|---|
| AU | 4231978 | 6/1979 |
| BE | 654427 | 1/1965 |
| CH | 560532 | 4/1975 |

(Continued)

OTHER PUBLICATIONS

Speed Cover Brochure, "The Simple Solution For Those Peak Volume Periods", Highland Supply Corporation, ©1989.
"Speed Sheets and Speed Rolls" Brochure, Highland Supply Corporation, © 1990.
"Color Them Happy with Highlander Products" ©1992.
"Costa Keeps the Christmas Spirit", Supermarket Floral, Sep. 15, 1992.

(Continued)

Primary Examiner—Teri Pham Luu
Assistant Examiner—Francis T. Palo
(74) Attorney, Agent, or Firm—Dunlap, Codding & Rogers, P.C.

(57) ABSTRACT

A floral container sized to contain a flower pot or a growing medium and a plant, the floral container having a base and a detachable upper portion constructed in the configuration of an accordion fold which can be expanded vertically. The floral container may optionally have a skirt portion.

35 Claims, 7 Drawing Sheets

U.S. PATENT DOCUMENTS

| | | | |
|---|---|---|---|
| 2,510,120 A | 6/1950 | Leander | 117/122 |
| 2,529,060 A | 11/1950 | Trillich | 117/68.5 |
| 2,621,142 A | 12/1952 | Wetherell | 154/117 |
| 2,648,487 A | 8/1953 | Linda | 229/55 |
| 2,688,354 A | 9/1954 | Berger | 150/28 |
| 2,774,187 A | 12/1956 | Smithers | 47/41 |
| 2,822,287 A | 2/1958 | Avery | 117/14 |
| 2,846,060 A | 8/1958 | Yount | 206/58 |
| 2,850,842 A | 9/1958 | Eubank, Jr. | 47/58 |
| 2,883,262 A | 4/1959 | Borin | 21/56 |
| 2,989,828 A | 6/1961 | Warp | 53/390 |
| 3,022,605 A | 2/1962 | Reynolds | 47/58 |
| 3,080,680 A | 3/1963 | Reynolds et al. | 47/37 |
| 3,094,810 A | 6/1963 | Kalpin | 47/37 |
| 3,121,647 A | 2/1964 | Harris et al. | 118/202 |
| 3,130,113 A | 4/1964 | Silman | 161/97 |
| 3,271,922 A | 9/1966 | Wallerstein et al. | 53/3 |
| 3,322,325 A | 5/1967 | Bush | 229/62 |
| 3,376,666 A | 4/1968 | Leonard | 47/41 |
| 3,380,646 A | 4/1968 | Doyen et al. | 229/57 |
| 3,431,706 A | 3/1969 | Stuck | 53/390 |
| 3,508,372 A | 4/1970 | Wallerstein et al. | 53/3 |
| 3,510,054 A | 5/1970 | Sanni et al. | 229/66 |
| 3,512,700 A | 5/1970 | Evans et al. | 229/53 |
| 3,550,318 A | 12/1970 | Remke et al. | 47/37 |
| 3,552,059 A | 1/1971 | Moore | 47/41.12 |
| 3,554,434 A | 1/1971 | Anderson | 229/55 |
| 3,556,389 A | 1/1971 | Gregoire | 229/53 |
| 3,557,516 A | 1/1971 | Brandt | 53/14 |
| 3,620,366 A | 11/1971 | Parkinson | 206/59 |
| 3,681,105 A | 8/1972 | Milutin et al. | 117/15 |
| 3,767,104 A | 10/1973 | Bachman et al. | 229/7 |
| 3,793,799 A | 2/1974 | Howe et al. | 53/32 |
| 3,869,828 A | 3/1975 | Matsumoto | 47/34.11 |
| 3,888,443 A | 6/1975 | Flanigen | 248/152 |
| 3,962,503 A | 6/1976 | Crawford | 428/40 |
| 4,043,077 A | 8/1977 | Stonehocker | 47/66 |
| 4,054,697 A | 10/1977 | Reed et al. | 428/40 |
| 4,091,925 A | 5/1978 | Griffo et al. | 206/423 |
| 4,113,100 A | 9/1978 | Soja et al. | 206/602 |
| 4,118,890 A | 10/1978 | Shore | 47/28 |
| 4,189,868 A | 2/1980 | Tymchuck et al. | 47/84 |
| 4,216,620 A | 8/1980 | Weder et al. | 47/72 |
| 4,248,347 A | 2/1981 | Trimbee | 206/423 |
| D259,333 S | 5/1981 | Charbonneau | D9/306 |
| 4,265,049 A | 5/1981 | Gorewitz | 47/26 |
| 4,280,314 A | 7/1981 | Stuck | 53/241 |
| 4,297,811 A | 11/1981 | Weder | 47/72 |
| 4,333,267 A | 6/1982 | Witte | 47/84 |
| 4,347,686 A | 9/1982 | Wood | 47/73 |
| 4,376,703 A * | 3/1983 | Krauss | 210/238 |
| 4,380,564 A | 4/1983 | Cancio et al. | 428/167 |
| 4,400,910 A | 8/1983 | Koudstall et al. | 47/84 |
| 4,413,725 A | 11/1983 | Bruno et al. | 206/45.33 |
| D279,279 S | 6/1985 | Wagner | D11/143 |
| 4,546,875 A | 10/1985 | Zweber | 206/0.82 |
| 4,621,733 A | 11/1986 | Harris | 206/423 |
| 4,640,079 A | 2/1987 | Stuck | 53/390 |
| 4,717,262 A | 1/1988 | Roen et al. | 383/120 |
| 4,733,521 A | 3/1988 | Weder et al. | 53/580 |
| 4,765,464 A | 8/1988 | Ristvedt | 206/0.82 |
| 4,771,573 A | 9/1988 | Stengel | 47/67 |
| 4,773,182 A | 9/1988 | Weder et al. | 47/72 |
| 4,801,014 A | 1/1989 | Meadows | 206/423 |
| 4,810,109 A | 3/1989 | Castel | 383/105 |
| 4,835,834 A | 6/1989 | Weder | 29/525 |
| D301,991 S | 7/1989 | Van Sant | D11/149 |
| 4,941,572 A | 7/1990 | Harris | 206/423 |
| 4,980,209 A | 12/1990 | Hill | 428/34.1 |
| 4,989,396 A | 2/1991 | Weder et al. | 53/397 |
| 5,073,161 A | 12/1991 | Weder et al. | 493/154 |
| 5,074,675 A | 12/1991 | Osgood | 383/122 |
| 5,105,599 A | 4/1992 | Weder | 53/399 |
| 5,111,638 A | 5/1992 | Weder | 53/397 |
| 5,120,382 A | 6/1992 | Weder | 156/212 |
| 5,152,100 A | 10/1992 | Weder et al. | 47/72 |
| 5,181,364 A | 1/1993 | Weder | 53/397 |
| D335,105 S | 4/1993 | Ottenwalder et al. | D11/164 |
| 5,199,242 A | 4/1993 | Weder et al. | 53/397 |
| 5,205,108 A | 4/1993 | Weder et al. | 53/397 |
| 5,228,234 A | 7/1993 | de Klerk et al. | 47/41.01 |
| 5,235,782 A | 8/1993 | Landau | 47/72 |
| 5,239,775 A | 8/1993 | Landau | 47/72 |
| 5,249,407 A | 10/1993 | Stuck | 53/399 |
| 5,259,106 A | 11/1993 | Weder et al. | 29/469.5 |
| 5,307,606 A | 5/1994 | Weder | 53/410 |
| 5,315,785 A | 5/1994 | Avôt et al. | 47/72 |
| 5,350,240 A | 9/1994 | Billman et al. | 383/104 |
| 5,353,575 A | 10/1994 | Stepanek | 53/461 |
| 5,356,361 A | 10/1994 | Watenpaugh | 482/111 |
| 5,361,482 A | 11/1994 | Weder et al. | 29/469 |
| 5,388,695 A | 2/1995 | Gilbert | 206/423 |
| 5,428,939 A | 7/1995 | Weder et al. | 53/397 |
| 5,433,221 A | 7/1995 | Adair | 128/849 |
| 5,443,670 A | 8/1995 | Landau | 156/191 |
| 5,493,809 A | 2/1996 | Weder et al. | 47/72 |
| D368,025 S | 3/1996 | Sekerak et al. | D9/305 |
| 5,496,251 A | 3/1996 | Cheng | 493/224 |
| 5,496,252 A | 3/1996 | Gilbert | 493/224 |
| 5,526,932 A | 6/1996 | Weder | 206/423 |
| 5,533,638 A | 7/1996 | Robbins | 220/8 |
| 5,572,849 A | 11/1996 | Weder et al. | 53/399 |
| 5,572,851 A | 11/1996 | Weder | 53/399 |
| 5,575,133 A | 11/1996 | Weder et al. | 53/397 |
| 5,617,703 A | 4/1997 | Weder | 53/413 |
| 5,624,320 A | 4/1997 | Martinez | 472/51 |
| 5,625,979 A | 5/1997 | Weder | |
| 5,647,168 A | 7/1997 | Gilbert | 47/72 |
| 5,647,193 A | 7/1997 | Weder et al. | 53/465 |
| 5,715,944 A | 2/1998 | Windisch | 206/423 |
| 5,749,171 A | 5/1998 | Weder | 47/72 |
| 5,896,698 A | 4/1999 | Nurse | 47/72 |
| 2004/0231241 A1 * | 11/2004 | Lepoutre | 47/72 |

FOREIGN PATENT DOCUMENTS

| | | |
|---|---|---|
| DE | 345464 | 12/1921 |
| DE | 513971 | 11/1930 |
| DE | 1166692 | 3/1964 |
| DE | 1962947 | 6/1971 |
| DE | 2060812 | 11/1971 |
| DE | 2748626 | 5/1979 |
| DE | 3445799 | 6/1986 |
| DE | 3829281 | 5/1989 |
| DE | 3911847 | 10/1990 |
| DE | 4009633 | 10/1991 |
| EP | 0050990 | 5/1982 |
| EP | 0791543 | 8/1997 |
| FR | 1376047 | 9/1964 |
| FR | 2036163 | 12/1970 |
| FR | 2137325 | 12/1972 |
| FR | 2272914 | 12/1975 |
| FR | 2489126 | 3/1982 |
| FR | 2610604 | 8/1988 |
| FR | 2603159 | 3/1989 |
| FR | 2619698 | 3/1989 |
| GB | 5605 | 5/1885 |
| GB | 1204647 | 9/1970 |
| GB | 2056410 | 3/1981 |
| GB | 2074542 | 11/1981 |
| GB | 2128083 | 4/1984 |
| GB | 2252708 | 8/1992 |

| IT | 224507 | 4/1996 |
| JP | 542958 | 2/1993 |
| NL | 8301709 | 12/1984 |
| NL | 1000658 | 1/1996 |
| WO | 9315979 | 8/1993 |

OTHER PUBLICATIONS

"Super Seller", Supermarket Floral, Sep. 15, 1992.
"Halloween", Link Magazine, Sep. 15, 1992.
"Now More Than Ever", Supermarket Floral, Sep. 1992.
Le Plant Sac Advertisement, published prior to Sep. 26, 1987.
"A World of Cut Flower and Pot Plant Packaging" Brochure, Klerk's Plastic Products Manufacturing, Inc., published prior to Mar. 31, 1994, 6 pages.
Chantler & Chantler brochure showing Zipper Sleeve™ and Florasheet®, published prior to Mar. 31, 1994, 2 pages.

"Stand Alone Plastic Bagmaking" brochure, AMI, Atlanta, GA, Feb. 15, 1996, 2 pages.
"Foil Jackets" brochure, Custom Medallion, Inc., Dec., 1996, 2 pages.
"Derwent Abstract" of FR 2610604A. It is noted that the abstract is an incorrect English translation of the contents of the French patent. The French patent does not enable or disclose adhesively attaching the covering to the container. 1988.
"Silver Linings" Brochure, Affinity Diversified Industries, Inc., 1986. The Silver Linings brochure shows a floral sleeve with a closed bottom. The brochure shows, in one embodiment, a vase with flowers inside a "cut flower" sleeve with the sleeve tied with a ribbon about the neck of the vase.

* cited by examiner

FLORAL CONTAINER WITH ACCORDION FOLDED UPPER PORTION

CROSS REFERENCE TO RELATED APPLICATIONS

The present application is a continuation-in-part of U.S. Ser. No. 09/732,625 filed Dec. 8, 2000, now abandoned, the entirety of which is hereby expressly incorporated by reference herein in its entirety.

FIELD OF THE INVENTION

This invention generally relates to floral containers used to contain floral groupings and media, or used to wrap flower pots containing floral groupings and/or media containing floral groupings, and methods of using same.

DETAILED DESCRIPTION OF THE INVENTION

Figure 1:
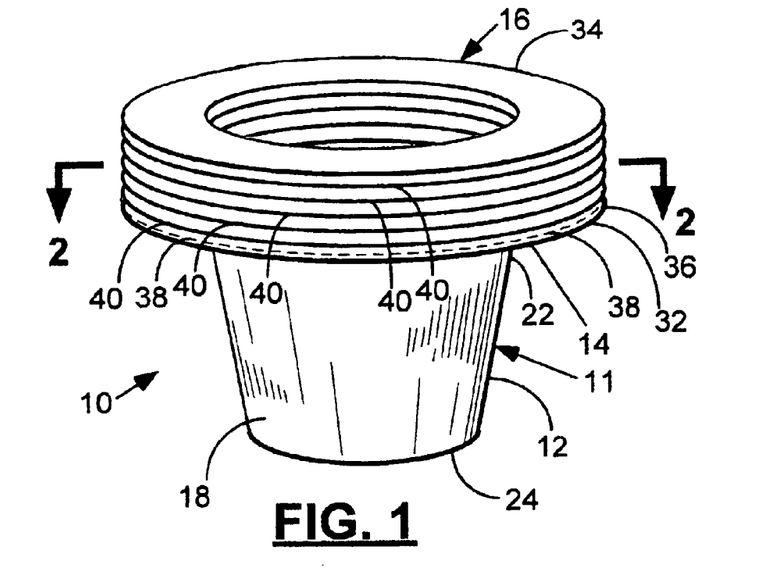
FIG. 1 is a perspective view of a floral container having an accordion-folded portion constructed in accordance with the present invention.
Figure 2:
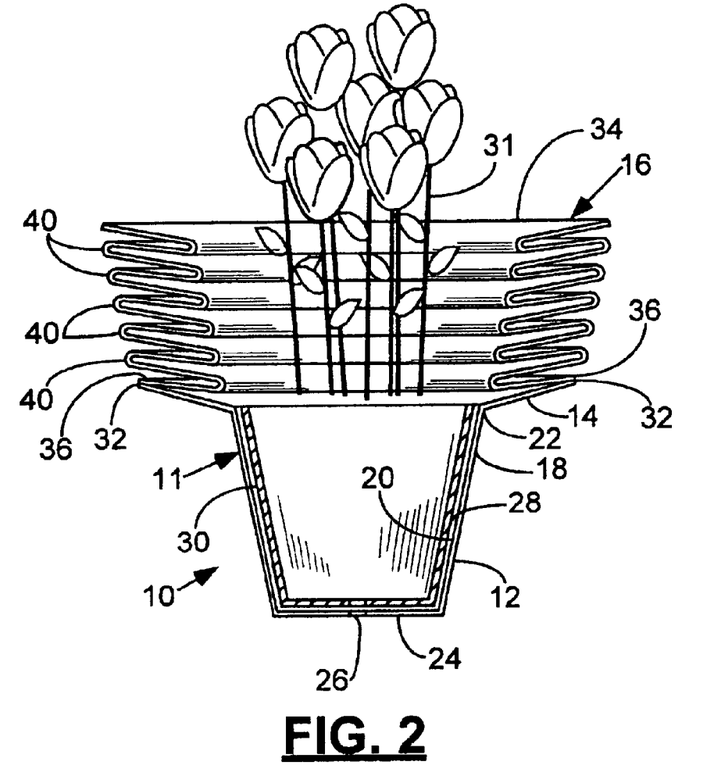
FIG. 2 is a cross-sectional view of the floral container of FIG. 1 taken along line 2—2.

Shown in FIGS. 1 and 2 is a floral container (which may be a pot or pot cover) designated by the general reference numeral 10. The floral container 10 has a lower portion 11 having a base portion 12 and a skirt portion 14, and an upper sleeve portion 16. The base portion 12 has an outer peripheral surface 18, an inner peripheral surface 20, an upper end 22 and a bottom end 24 which may optionally have one or more drainage holes 26 as shown in FIG. 2. The base portion 12 also has an inner retaining space 28 for containing a pot 30 containing a plant 31. Any of the floral containers 10 described herein may be used as a pot or as a container for a plant and growing medium, without a separate pot used therewith. That is, the items described herein can be used as either pot covers or pots. The base portion 12 can have any desired shape or configuration, such as cylindrical, frusto-conical or rectangular as long as the base portion 12 functions in accordance with the present invention.

The skirt portion 14 is connected to the upper end 22 of the base portion 12 and extends a distance therefrom. The skirt portion 14 has an outer peripheral edge 32. The upper sleeve portion 16 has an upper peripheral edge 34 and is connected at its lower end 36 to the skirt portion 14 near the outer peripheral edge 32 of the skirt portion 14. The upper sleeve portion 16 is detachable at its lower end 36 from the skirt portion 14 via a detaching element 38, which preferably is a line of perforations, as indicated in FIG. 1. The upper sleeve portion 16 is an accordion fold which is constructed of a plurality of Z-folds 40 layered upon one another in an accordion configuration as shown in FIGS. 1 and 2. Preferably, the Z-folds 40 are more or less horizontally oriented, although in other versions they may be diagonally oriented, or even somewhat vertically oriented. In any event, the base portion 12 is free of such an accordion fold. The base portion 12 may have folded overlapping portions, for example as are made using the method shown in U.S. Pat. No. 4,773,182, which is hereby expressly incorporated herein by reference, or side pleats, but does not have an accordion type fold which can expand vertically. The floral container 10 is preferably constructed so that the base portion 12 is opened, that is, the floral container 10 is not initially constructed in a flattened condition, although the upper sleeve portion 16 may be initially constructed in a substantially flattened condition.

Figure 3:
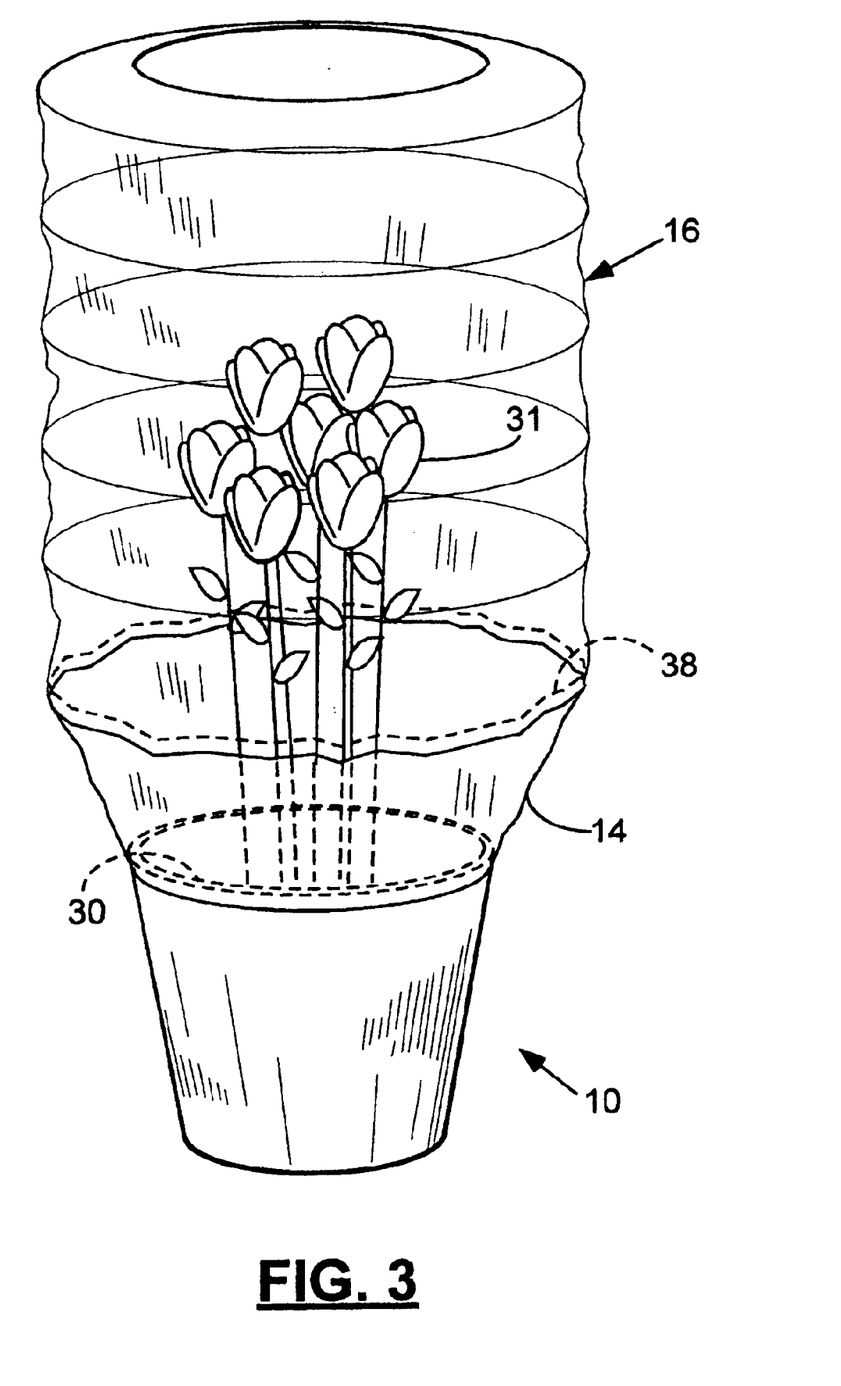
FIG. 3 is a perspective view of the floral container of FIG. 1 disposed about a plant and the accordion-folded portion expanded.

FIG. 3 shows the floral container 10 in use as a covering for the pot 30 with the plant 31 therein wherein the upper sleeve portion 16 of the floral container 10 has been erected vertically about the plant 31 and wherein the detaching element 38 is shown indicating a separation point between the skirt portion 14 and the upper sleeve portion 16. The floral container 10 may be constructed without a detaching element 38 wherein the upper sleeve portion 16 is not readily detachable without using an external detaching or severing device.

Figure 4:
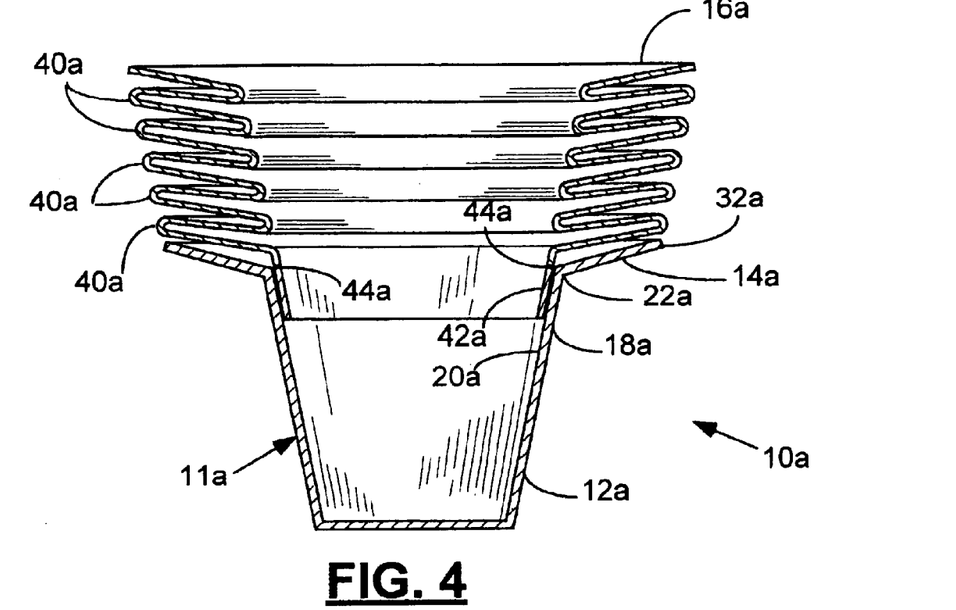
FIG. 4 is a cross-sectional view of an alternative version of a floral container constructed in accordance with the present invention.

FIG. 4 shows a floral container 10a which is similar to floral container 10, in that it has a lower portion 11a having a base portion 12a and a skirt portion 14a, and an upper sleeve portion 16a. The base portion 12a has an outer peripheral surface 18a, an inner peripheral surface 20a, and an upper end 22a. The skirt portion 14a has an outer peripheral edge 32a, and the upper sleeve portion 16a has a plurality of Z-folds 40a forming an accordion fold. Floral container 10a differs from floral container 10 primarily in that floral container 10a has a lower end portion 42a of the upper sleeve portion 16a attached to a portion of the inner peripheral surface 20a of the base portion 12a rather than to the skirt portion 14a. The skirt portion 14a therefore extends freely from the upper end 22a of the base portion 12a. The upper sleeve portion 16a is detachable via a detaching element 44a, such as a line of perforations. The upper sleeve portion 16a is substantially reversibly expandable in a substantially vertical direction in that the upper sleeve portion 16a may expand upwardly without any substantial permanent deformation of the Z-folds 40a. The accordion fold is expandable to a length at least twice that of a length of the accordion fold when the accordion fold is not expanded.

Figure 5:
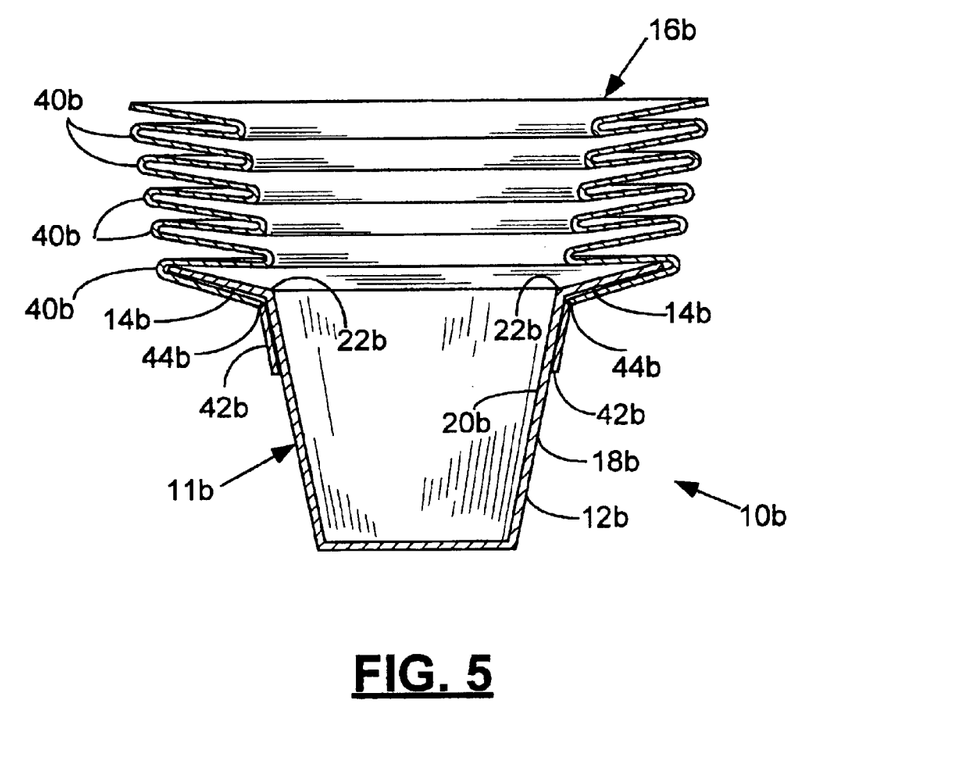
FIG. 5 is a cross-sectional view of another alternative version of a floral container constructed in accordance with the present invention.

FIG. 5 shows a floral container 10b which is similar to floral container 10 in that it has a lower portion 11b which has a base portion 12b having an outer peripheral surface 18*b*, an inner peripheral surface 20*b*, and an upper end 22*b*, a skirt portion 14*b*, and an upper sleeve portion 16*b* having and a plurality of Z-folds 40*b* forming an accordion fold. Floral container 10*b* differs from floral container 10 primarily in that floral container 10*b* has a lower end portion 42*b* of the upper sleeve portion 16*b* attached to a portion of the outer peripheral surface 18*b* of the base portion 12*b* rather than to the skirt portion 14*b*. The upper sleeve portion 16*b* is detachable via a detaching element 44*b* such as a line of perforations.

Figure 6:
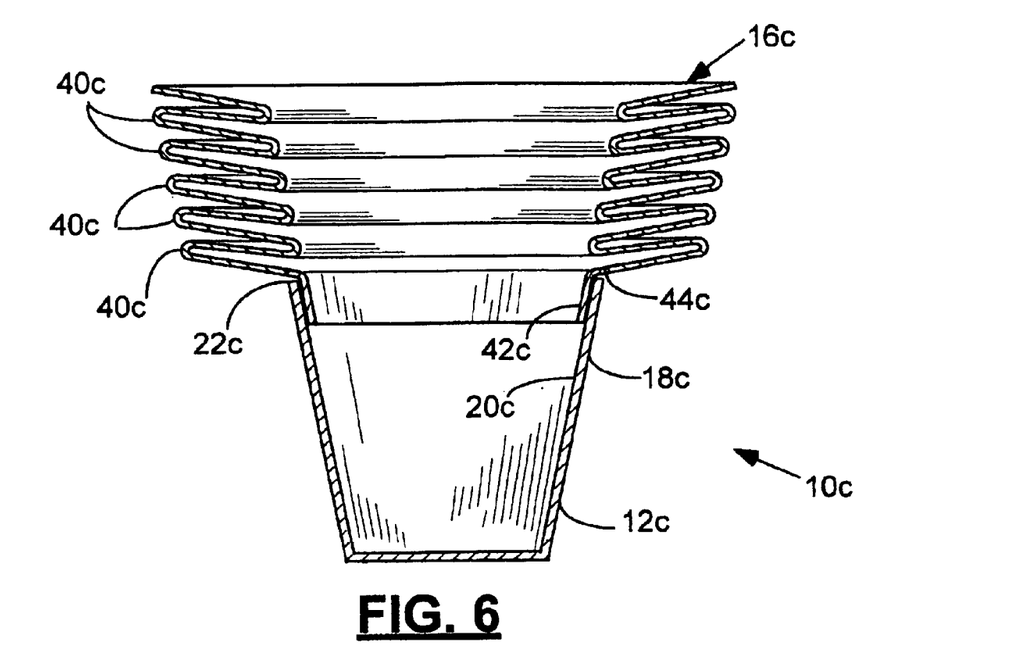
FIG. 6 is a cross-sectional view of an alternative version of a floral container constructed in accordance with the present invention.

FIG. 6 shows a floral container 10*c* which is similar to floral container 10*a* in that it has a base portion 12*c* having an outer peripheral surface 18*c*, an inner peripheral surface 20*c*, and an upper end 22*c*, and an upper sleeve portion 16*c* having a plurality of Z-folds 40*c*, and a lower end portion 42*c* which is connected to a portion of the inner peripheral surface 20*c* of the base portion 12*c* and a detaching element 44*c* for detaching the upper sleeve portion 16*c* from the base portion 12*c*. Floral container 10*c* differs from floral container 10*a* in that floral container 10*c* lacks a skirt portion which extends from the upper end 22*c* of the base portion 12*c*. Therefore when the upper sleeve portion 16*c* is detached, only the base portion 12*c* remains as a cover over a pot disposed therein.

Figure 7:
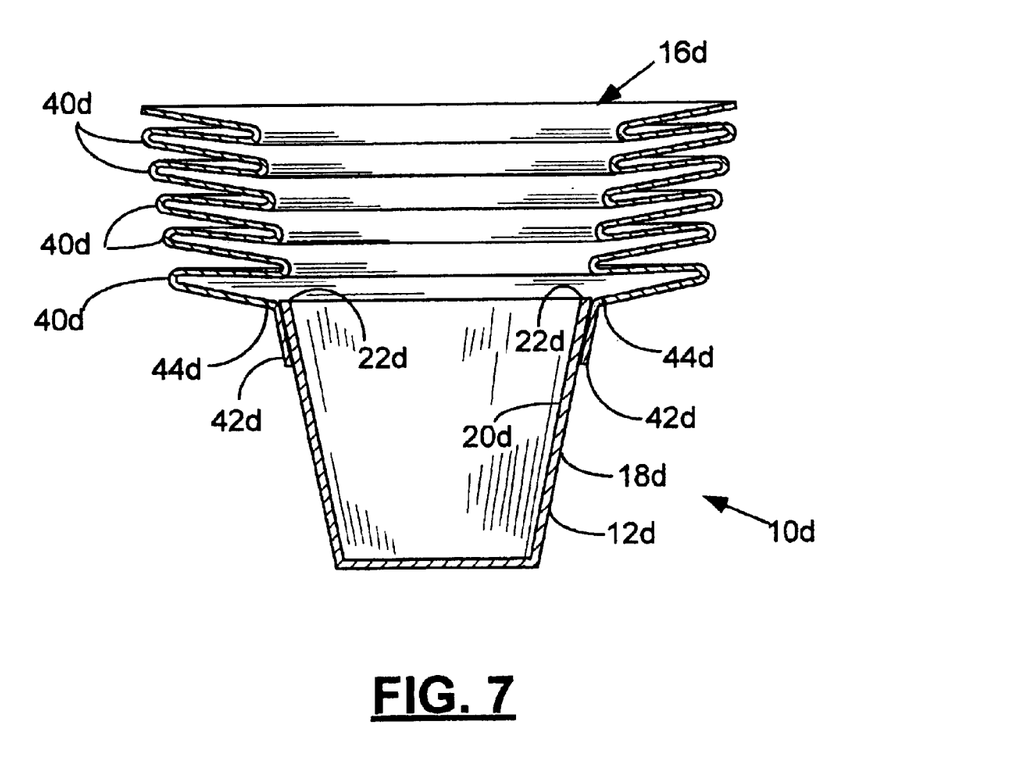
FIG. 7 is a cross-sectional view of an alternative version of a floral container constructed in accordance with the present invention.

FIG. 7 shows a floral container 10*d* which is similar to floral container 10*c* in that it has a base portion 12*d* having an outer peripheral surface 18*d*, an inner peripheral surface 20*d*, and an upper end 22*d*, and an upper sleeve portion 16*d* having a plurality of Z-folds 40*d*, and a detaching element 44*d* for detaching the upper sleeve portion 16*d* from the base portion 12*d*. Floral container 10*d* differs from floral container 10*c* in that in floral container 10*d* a lower end portion 42*d* is attached to the outer peripheral surface 18*d* of the base portion 12*d* rather than to the inner peripheral surface 20*d*.

Figure 8:
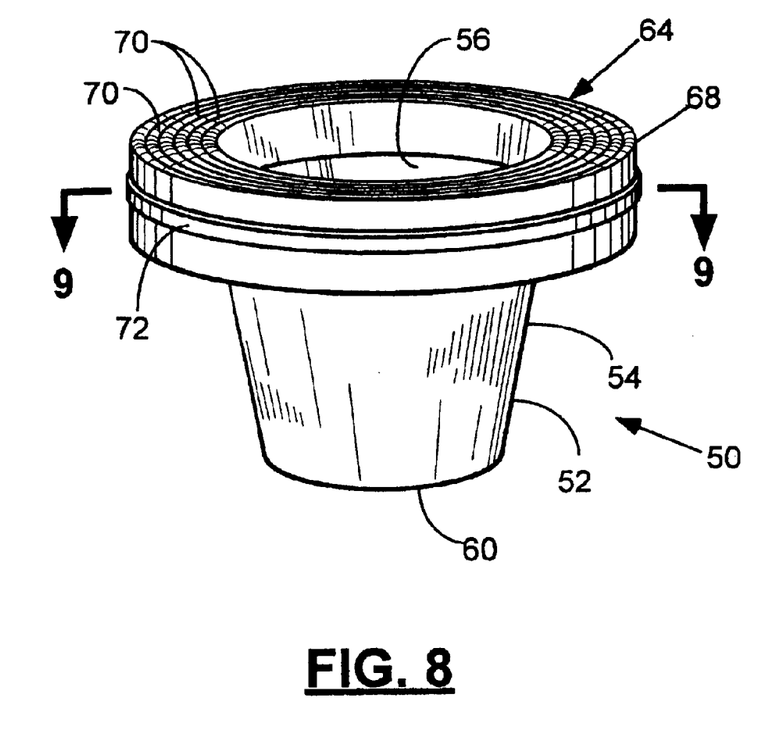
FIG. 8 is a perspective view of another version of a floral container constructed in accordance with the present invention.
Figure 9:
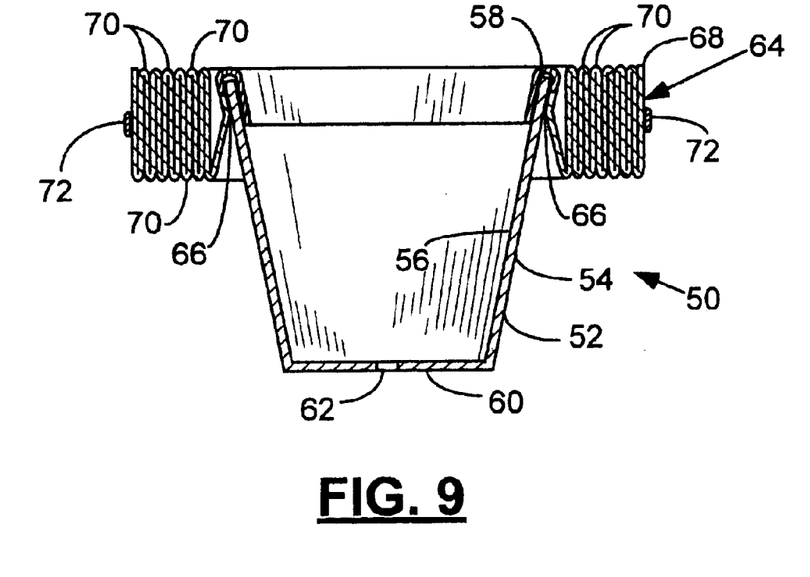
FIG. 9 is a cross-sectional view of the floral container of FIG. 8 taken along line 9—9.
Figure 10:
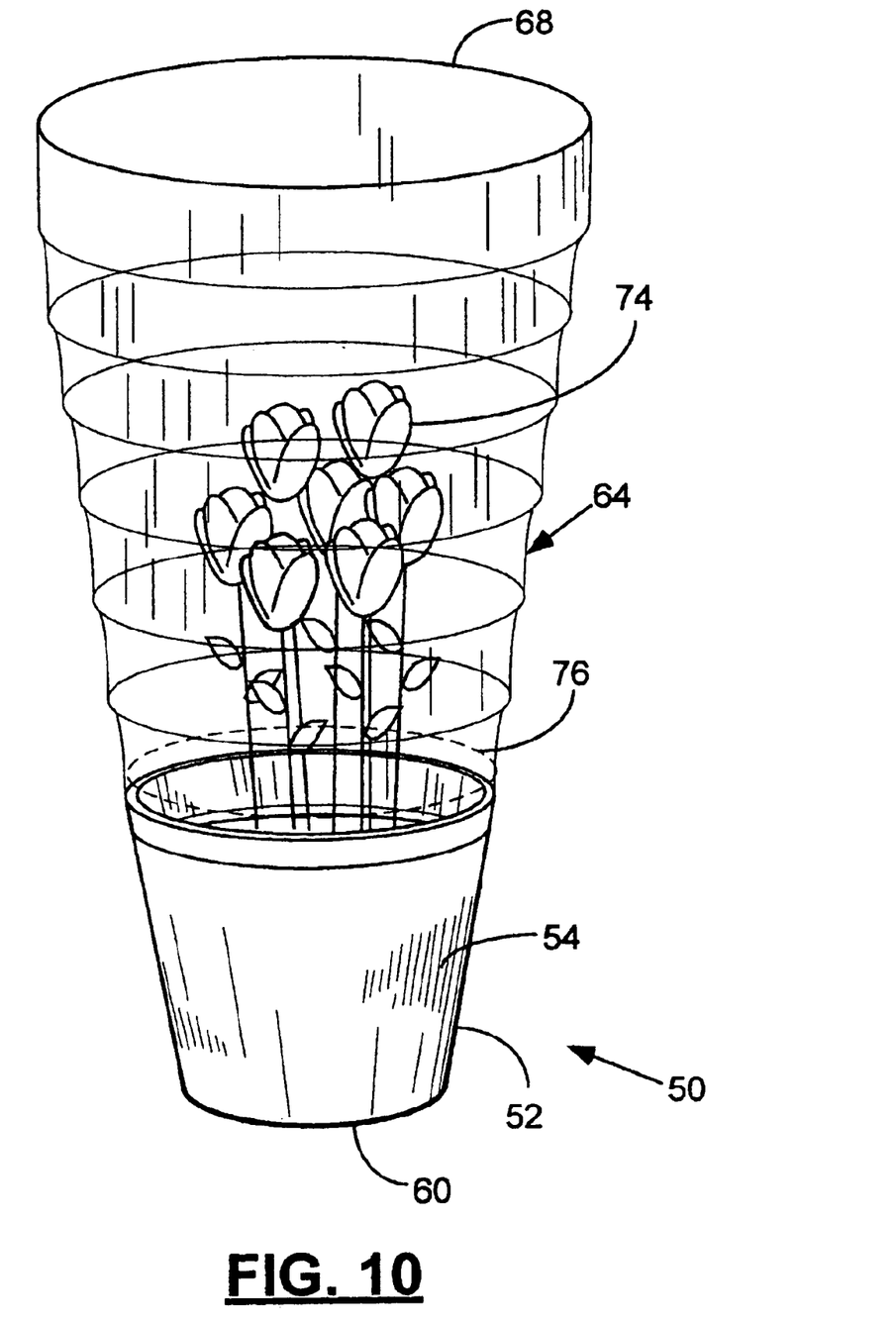
FIG. 10 is a perspective view of the floral container of FIG. 8 disposed about a plant with the accordion-folded portion expanded.

FIGS. 8–10 show a floral container 50 which comprises a base portion 52 having an outer peripheral surface 54, an inner peripheral surface 56, an upper end 58, and a bottom 60 which may have a drainage hole (or holes) 62 disposed therein (FIG. 9). The floral container 50 further comprises an upper sleeve portion 64 comprising an inner edge 66 disposed over the upper end 58 of the base portion 52 of the floral container 50. Thus, the upper sleeve portion 64 can be attached to a portion of the outer peripheral surface 54 and or inner peripheral surface 56 near the upper end 58 of the base portion 52 (or to a portion of the inner peripheral surface 56 near the upper end 58 of the base portion 52) or to a portion of the outer peripheral surface 54 near the upper end 58 of the base portion. The upper sleeve portion 64 further comprises, as in other embodiments of the invention described herein, an outer edge 68 and an accordion fold formed of a plurality of Z-folds 70 arranged more or less concentrically about the upper end 58 of the base portion 52. In a preferred embodiment the Z-folds 70 of the upper sleeve portion 64 are held in a collapsed position by a securing device 72, such as a ring, band, ribbon, string, tie, wire or other such device known to a person of ordinary skill in the art. When it is desired to expand the upper sleeve portion 64, the securing device 72 is removed and the upper sleeve portion 64 pulled upwardly at the outer edge 68 as shown in FIG. 10 to surround a plant 74 disposed within and extending a distance from the floral container 50 (or a potted plant disposed therein). The upper sleeve portion 64 can be detached from the base portion 52 via a detaching element 76, shown in FIG. 10 as a line of perforations. In a preferred method of the present invention, the plant 74 is cultivated (with or without a pot) in the floral container 50 until the plant 74 reaches a particular stage of growth, at which time the upper sleeve portion 64 is extended about the plant 74 and the floral container 50 prepared for shipment or other disposition, or for other uses familiar to those of ordinary skill in the art.

Figure 11:
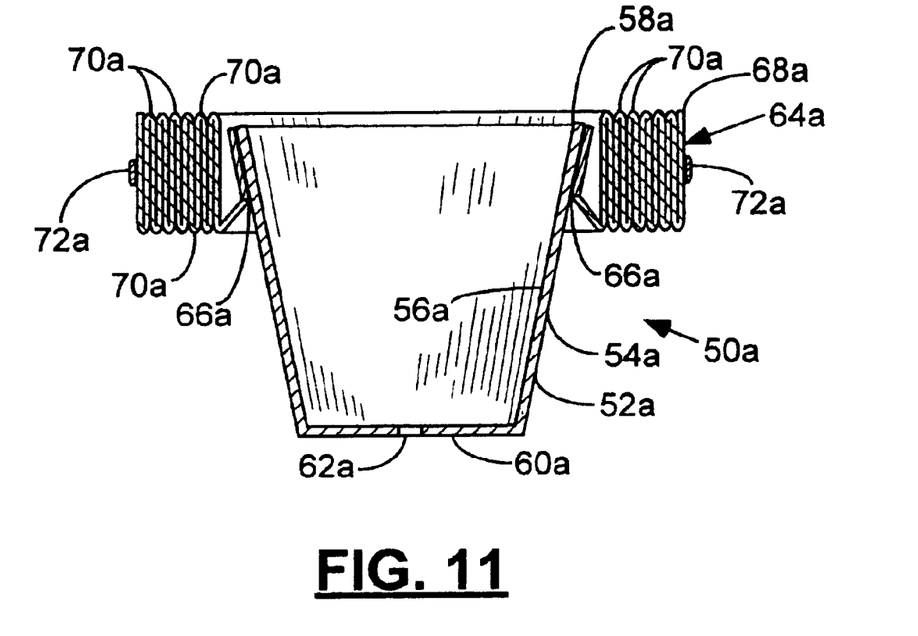
FIG. 11 is a cross-sectional view of an alternative version of a floral container constructed in accordance with the present invention.

FIG. 11 shows a floral container 50*a* which is similar to floral container 50 in that it has a base portion 52*a* having an outer peripheral surface 54*a*, an inner peripheral surface 56*a*, an upper end 58*a*, and a bottom 60*a* which may have a drainage hole (or holes) 62*a* disposed therein. The floral container 50*a* further comprises an upper sleeve portion 64*a* comprising an inner edge 6*a* attached to a portion of the outer peripheral surface 54*a* near the upper end 58*a* of the base portion 52*a*. The upper sleeve portion 64*a* further comprises, as in other embodiment of the invention described herein, an outer edge 68*a* and a accordion fold found if a plurality of Z-folds 70*a* arranged more or less concentrically about the upper end 58*a* of the base portion 52*a*. The Z-folds 70*a* of the upper sleeve portion 64*a* are held in a collapsed position by a securing device 72*a* as herein before described. When it is desired to expand the upper sleeve portion 64*a*, the securing device 72 is removed and the upper sleeve portion 64*a* pulled upwardly at the outer edge 68*a* in a similar manner as the upper sleeve portion 64 is pulled upwardly as herein before described with reference to FIG. 10. The upper sleeve portion 64*a* can also be provided with a detaching element (not shown) while is similar to the detaching element 76 shown in FIG. 10 so that the upper sleeve portion 64*a* can be detached from the base portion 52*a* of the floral container 50*a*.

The term "detaching element" as used generally herein, means any element or device, or combination of elements, or features, such as, but not by way of limitation, perforations, tear strips, weakened areas, zippers, and any other devices or elements of this nature known in the art, or any combination thereof, which enable the tearing away or detachment of one object from another. Therefore, while perforations are shown and described in detail herein, it will be understood that tear strips, zippers, or any other "detaching elements" known in the art, or any combination thereof, could be substituted therefore and/or used therewith.

In a preferred version, the floral containers 10–10*d*, 50 and 50*a* are constructed of a material resistant or impermeable to leakage, while the upper sleeve portions 16–16*d*, 64 and 64*a* are primarily constructed of a thinner transparent or translucent material.

Any thickness of material may be utilized in accordance with the present invention as long as the floral containers 10–10*d*, 50 and 50*a* may be formed as described herein, and as long as the floral containers 10–10*d*, 50 and 50*a* may contain at least a portion of a pot or potted plant or a floral grouping, as described herein. The material from which the floral containers 10–10*d*, 50 and 50*a* are constructed preferably has a thickness in a range from about 0.1 mil to about 30 mils. Often, the thickness of the floral containers 10–10*d*, 50 and 50*a* are in a range from about 0.5 mil to about 10 mils. Preferably, the floral containers 10–10*d*, 50 and 50*a* have a thickness in a range from about 1.0 mil to about 5 mils. More preferably, the floral containers 10–10*d*, 50 and 50*a* are constructed from a material which is flexible, semi-rigid, rigid, or any combination thereof. The floral containers 10–10*d*, 50 and 50*a* may be constructed of a single layer of material or a plurality of layers of the same or different types of materials. The layers of material comprising the floral containers 10–10*d*, 50 and 50*a* may be connected together or laminated or may be separate layers. Such materials used to construct the floral containers 10–10d, 50 and 50a are described in U.S. Pat. No. 5,111,637 entitled "Method For Wrapping A Floral Grouping" issued to Weder et al., on May 12, 1992, which is hereby expressly incorporated herein by reference. Additionally, an insulating material such as bubble film, preferable as one of two or more layers, can be utilized in order to provide additional protection for the item, such as the floral grouping, contained therein.

The floral containers 10–10d, 50 and 50a are constructed from any suitable material that is capable of being formed into a floral container and used to contain a pot and a floral grouping disposed therein or a floral grouping and growing medium. Preferably, the material comprises untreated or treated paper, metal foil, polymer film such as polypropylene, non-polymer film, woven or nonwoven or synthetic or natural fabric, cardboard, fiber, cloth, burlap, or laminations or combinations thereof.

The term "polymer film" means a synthetic polymer or a naturally occurring polymer such as cellophane. A polymer film is relatively strong and not as subject to tearing (substantially non-tearable), as might be the case with paper or foil.

In one embodiment, the sleeve may be constructed from a sheet comprising two polypropylene films. The material comprising the sleeve may be connected together or laminated or may be separate layers. In an alternative embodiment, the sleeve may be constructed from only one of the polypropylene films.

The material from which the floral container is formed may vary in color and may consist of designs or decorative patterns which are printed, etched, and/or embossed thereon using inks or other printing materials. An example of an ink which may be applied to the surface of the material is described in U.S. Pat. No. 5,147,706 entitled "Water Based Ink On Foil And/Or Synthetic Organic Polymer" issued to Kingman on Sep. 15, 1992 and which is hereby expressly incorporated herein by reference.

In addition, the material may have various colorings, coatings, flocking and/or metallic finishes, or other decorative surface ornamentation applied separately or simultaneously or may be characterized totally or partially by pearlescent, translucent, transparent, iridescent, neon, or the like, qualities. The material may further comprise, or have applied thereto, one or more scents. Each of the above-named characteristics may occur alone or in combination and may be applied to the upper and/or lower surface of the material comprising the floral containers 10–10d, 50 and 50a. Moreover, portions of the material used in constructing the floral containers 10–10d, 50 and 50a may vary in the combination of such characteristics. The material utilized for the floral containers 10–10d, 50 and 50a may be opaque, translucent, transparent, or partially clear or tinted transparent.

The term "floral grouping" as used herein means cut fresh flowers, artificial flowers, a single flower or other fresh and/or artificial plants or other floral materials and may include other secondary plants and/or ornamentation or artificial or natural materials which add to the aesthetics of the overall floral grouping. The floral grouping comprises a bloom or foliage portion and a stem portion. Further, the floral grouping may comprise a growing potted plant having a root portion (not shown) as well. However, it will be appreciated that the floral grouping may consist of only a single bloom or only foliage, or a botanical item, or a propagule. The term "floral grouping" may be used interchangeably herein with both the terms "floral arrangement" and "potted plant". The term "floral grouping" may also be used interchangeably herein with the terms "botanical item" and/or "propagule."

The term "growing medium" when used herein means any liquid, solid or gaseous material used for plant growth or for the cultivation of propagules, including organic and inorganic materials such as soil, humus, perlite, vermiculite, sand, water, and including the nutrients, fertilizers or hormones or combinations thereof required by the plants or propagules for growth.

The term "botanical item" when used herein means a natural or artificial herbaceous or woody plant, taken singly or in combination. The term "botanical item" also means any portion or portions of natural or artificial herbaceous or woody plants including stems, leaves, flowers, blossoms, buds, blooms, cones, or roots, taken singly or in combination, or in groupings of such portions such as bouquet or floral grouping.

The term "propagule" when used herein means any structure capable of being propagated or acting as an agent of reproduction including seeds, shoots, stems, runners, tubers, plants, leaves, roots or spores.

In accordance with the present invention, a bonding material may be disposed on a portion of the floral containers 10–10d, 50 and 50a, for example in the manner shown in U.S. Pat. No. 5,493,809 which is hereby expressly incorporated by reference herein in its entirety. The term "bonding material" generally means an adhesive, frequently a pressure sensitive adhesive, or a cohesive.

It will be understood by a person of ordinary skill in the art that equipment and devices for forming accordion folds in materials are commercially available, and are well known to a person of ordinary skill in the art. Therefore, further discussion of the construction of the accordion folds described herein is not deemed necessary.

The term "floral container" as used herein refers to any type of container used for holding a floral grouping or plant. Examples include pots, including, but not by way of limitation, clay pots, wooden pots, plastic pots, pots made from natural mad/or synthetic fibers, or any combination thereof. The pot is adapted to receive a floral grouping in the retaining space. The floral grouping may be disposed within the pot along with a suitable growing medium described in further detail below, or other retaining medium, such as a floral foam.

Changes may be made in the construction and the operation of the various components, elements and assemblies described herein or in the steps or the sequence of steps of the methods described herein without departing from the spirit and scope of the invention as defined in the following claims.

What is claimed is:

1. A floral container for a floral grouping, comprising:
   a lower portion comprising:
      a base portion having an upper end, a lower end, an outer peripheral surface, an inner peripheral surface, and an inner retaining space sized to substantially contain a pot or growing medium, and the floral grouping, and wherein the base portion is initially constructed to have an opened, nonflattened condition;
      a skirt portion having an outer edge, the skirt portion extending from the upper end of the base portion; and
   an upper sleeve portion connected to a portion of the lower portion and detachable therefrom via a detaching element, substantially the entire upper sleeve portion comprising an accordion fold comprising a plurality of folds layered upon one another and which is expandable in a substantially vertical direction from the lower portion about a vertical axis and wherein the upper sleeve portion is sized to extend substantially about the floral grouping after the accordion fold has been expanded vertically.

2. The floral container of claim 1 wherein the upper sleeve portion is sized such that when a pot having a floral grouping therein or a growing medium and floral grouping extending a distance therefrom is disposed within the base portion, the upper sleeve portion substantially surrounds and encompasses the floral grouping when expanded vertically.

3. The floral container of claim 1 wherein the upper sleeve portion is attached to the outer peripheral surface of the base portion.

4. The floral container of claim 1 wherein the upper sleeve portion is attached to the inner peripheral surface of the base portion.

5. The floral container of claim 1 wherein the upper sleeve portion is attached to the outer edge of the skirt portion.

6. The floral container of claim 1 wherein the base portion has a frustoconical shape.

7. The floral container of claim 1 wherein the base portion has a cylindrical shape.

8. The floral container of claim 1 wherein the base portion has a rectangular shape.

9. A method of covering a pot having a floral grouping, comprising:
providing a pot;
providing a floral container comprising:
a lower portion comprising:
a base portion having an upper end, a lower end, an outer peripheral surface, an inner peripheral surface, and an inner retaining space sized to substantially contain a pot, and wherein the base portion is initially constructed to have an opened, nonflattened condition; and
a skirt portion having an outer edge, the skirt portion extending from the upper end of the base portion; and
an upper sleeve portion connected to a portion of the lower portion and detachable therefrom via a detaching element, substantially the entire upper sleeve portion comprising an accordion fold comprising a plurality of folds layered upon one another and which is expandable in a substantially vertical direction from the lower portion about a vertical axis and wherein the upper sleeve portion is sized to extend substantially about the floral grouping after the accordion fold has been expanded vertically; and
disposing the pot within the inner retaining space of the base portion of the floral container.

10. The method of claim 9 wherein, in the step of providing a pot, the upper sleeve portion is sized such that when the pot containing the floral grouping therein and extending a distance therefrom is disposed within the base portion, the upper sleeve portion substantially surrounds and encompasses the floral grouping, when expanded vertically.

11. The method of claim 9 wherein the upper sleeve portion is attached to the outer peripheral surface of the base portion.

12. The method of claim 9 wherein the upper sleeve portion is attached to the inner peripheral surface of the base portion.

13. The method of claim 9 wherein the upper sleeve portion is attached to the outer edge of the skirt portion.

14. The method of claim 9 wherein the base portion has a frustoconical shape.

15. The method of claim 9 wherein the base portion has a cylindrical shape.

16. The method of claim 9 wherein the base portion has a rectangular shape.

17. A floral container for a floral grouping, comprising:
a base portion having an upper end, a lower end, an outer peripheral surface, an inner peripheral surface, and an inner retaining space sized to contain a pot or growing medium and the floral grouping, and wherein the base portion is initially constructed to have an opened, nonflattened condition; and
a detachable upper sleeve portion connected to a portion of the base portion, substantially the entire upper sleeve portion comprising an accordion fold comprising a plurality of folds layered upon one another and which extends circumferentially about an upper end of the base portion and which is expandable in a substantially vertical direction from the base portion about a vertical axis and wherein the upper sleeve portion is sized to extend substantially about the floral grouping after the accordion fold has been expanded vertically.

18. The floral container of claim 17 wherein the upper sleeve portion is detachable from the base portion via a detaching element.

19. The floral container of claim 17 wherein the upper sleeve portion is sized to substantially surround and encompass a floral grouping disposed within and extending from the floral container.

20. The floral container of claim 17 wherein the upper sleeve portion is attached to the outer peripheral surface of the base portion.

21. The floral container of claim 17 wherein the upper sleeve portion is attached to the inner peripheral surface of the base portion.

22. The floral container of claim 17 wherein the upper sleeve portion is attached to the upper end of the base portion.

23. The floral container of claim 17 wherein the base portion has a frustoconical shape.

24. The floral container of claim 17 wherein the base portion has a cylindrical shape.

25. The floral container of claim 17 wherein the base portion has a rectangular shape.

26. A method of cultivating a plant, comprising:
providing a floral container with the plant or a propagule comprising:
a base portion having a upper end, a lower end, an outer peripheral surface, an inner peripheral surface, and an inner retaining space sized to contain a growing medium and the floral grouping, and wherein the base portion is initially constructed to have an opened, nonflattened condition; and
a detachable upper sleeve portion connected to a portion of the base portion, substantially the entire upper sleeve portion comprising an accordion fold comprising a plurality of folds layered upon one another and which extends circumferentially about an upper end of the base portion and which is expandable in a substantially vertical direction from the base portion about a vertical axis and wherein the upper sleeve portion is sized to extend substantially about the floral grouping after the accordion fold has been expanded vertically; and
cultivating the plant or propagule in the floral container.

27. The method of claim 26 wherein the upper sleeve portion is detachable from the base portion via a detaching element.

28. The method of claim 26 wherein the upper sleeve portion is sized to substantially surround and encompass the plant or propagule after a period of cultivation.

29. The method of claim 26 wherein the upper sleeve portion is attached to the outer peripheral surface of the base portion.

30. The method of claim 26 wherein the upper sleeve portion is attached to the inner peripheral surface of the base portion.

31. The method of claim 26 wherein the base portion has a frustoconical shape.

32. The method of claim 26 wherein the base portion has a cylindrical shape.

33. The method of claim 26 wherein the base portion has a rectangular shape.

34. A floral container for covering a pot containing a floral grouping, comprising:
   a lower portion comprising:
      a base portion having an upper end, a lower end, an outer peripheral surface, an inner peripheral surface, and an inner retaining space sized to substantially contain a pot or growing medium, and the floral grouping, and wherein the base portion is initially constructed to have an opened, nonflattened condition;
      a skirt portion having an outer edge, the skirt portion extending from the upper end of the base portion; and
      an upper sleeve portion connected to a portion of the lower portion and detachable therefrom via a detaching element, the upper sleeve portion comprising an accordion fold comprising a plurality of folds layered upon one another, wherein the upper sleeve portion is substantially reversibly expandable in a substantially vertical direction from the lower portion about a vertical axis, wherein the accordion fold is supported substantially above the flower pot such that the accordion fold is configured to reveal the floral grouping when the accordion fold is in a collapsed position and the accordion fold is sized to substantially surround and to encompass the floral grouping after the accordion fold is completely expanded, wherein substantially the entire upper sleeve portion is comprised of an accordion fold.

35. A floral container for a floral grouping, comprising:
   a lower portion comprising:
      a base portion having an upper end, a lower end, an outer peripheral surface, an inner peripheral surface, and an inner retaining space sized to substantially contain a pot or growing medium, and the floral grouping, and wherein the base portion is initially constructed to have an opened, nonflattened condition;
      a skirt portion having an outer edge, the skirt portion extending from the upper end of the base portion; and
      an upper sleeve portion connected to a portion of the lower portion and detachable therefrom via a detaching element, the upper sleeve portion comprising an accordion fold comprising a plurality of folds layered upon one another and which is expandable in a substantially vertical direction from the lower portion about a vertical axis and wherein the upper sleeve portion is sized to extend substantially about the floral grouping after the accordion fold has been expanded vertically, wherein substantially the entire upper sleeve portion is comprised of an accordion fold, and wherein the accordion fold is expandable to a length at least twice that of a length of the accordion fold when the accordion fold is not expanded.

* * * * *